United States Patent [19]

Baratta

[11] Patent Number: 5,662,032

[45] Date of Patent: Sep. 2, 1997

[54] JUICER ATTACHMENT FOR A BLENDER

[76] Inventor: Joseph P. Baratta, 9035 Flynn Cir. #3, Boca Raton, Fla. 33496-6676

[21] Appl. No.: 616,210

[22] Filed: Mar. 15, 1996

[51] Int. Cl.$^6$ .............................. A23N 1/00; B02C 15/00; B04B 5/10

[52] U.S. Cl. ..................... 99/513; 366/205; 366/314; 241/37.5; 241/92; 241/282.2; 210/380.1

[58] Field of Search .................... 99/510, 511, 513, 99/501, 503; 366/205, 314; 210/360.1, 380.1, 369; 241/37.5, 92, 282.1, 282.2

[56] References Cited

U.S. PATENT DOCUMENTS

| | | |
|---|---|---|
| 959,581 | 5/1910 | Newton . |
| 2,086,911 | 7/1937 | Hill ............................................. 99/513 |
| 3,101,107 | 8/1963 | Posener et al. . |
| 3,612,125 | 10/1971 | Krauth ....................................... 366/205 |
| 4,194,697 | 3/1980 | Lembeck . |
| 4,240,338 | 12/1980 | McClean . |
| 4,350,087 | 9/1982 | Ramirez . |
| 4,506,601 | 3/1985 | Ramirez et al. . |
| 4,561,782 | 12/1985 | Jacobsen et al. ........................ 366/205 |
| 4,773,765 | 9/1988 | Erskine .................................... 366/205 |
| 5,074,201 | 12/1991 | Takeyama et al. . |
| 5,222,430 | 6/1993 | Wang . |
| 5,232,552 | 8/1993 | Lundberg et al. . |
| 5,257,575 | 11/1993 | Harrison et al. . |
| 5,289,763 | 3/1994 | Le Rouzic et al. . |
| 5,353,697 | 10/1994 | Venturati et al. . |

*Primary Examiner*—Reginald Alexander
*Attorney, Agent, or Firm*—Herbert L. Lerner; Laurence A. Greenberg

[57] ABSTRACT

A juicer attachment for a blender is disclosed. Blenders include a motor, a blade member having a bore and being driven by the motor, and a jar protruding into the bore of the blade member. The juicer attachment has a hollow base with a side wall and a lip for securing the juicer attachment to the blender by disposing the base in the bore of the blade member with the lip of the base being in contact with the jar. The juicer attachment also includes a hollow filter disposed in the jar. The filter has perforations and at least one step forming a lower side wall and an upper side wall. The side wall of the base is coupled with the lower side wall of the filter. The juicer attachment further includes a lid with a bore and a step forming a lower side wall. The lower side wall of the lid is coupled with the upper side wall of the filter. A plunger of the juicer attachment has a first end and a second end for dislodging clogged food material around the blade member of the blender in the filter by inserting the second end in the bore of the lid. A second embodiment of the juicer attachment has a jar with a base integrally joined with the jar.

6 Claims, 6 Drawing Sheets

JUICER ATTACHMENT FOR A BLENDER

BACKGROUND OF THE INVENTION

1. Field of the Invention

The invention relates to a juicer, and more particularly to a juicer attachment for a conventional blender.

2. Description of the Related Art

Juicers are popular household appliances to make fresh juice. However, heretofore known juicers have been separate appliances which are often cost prohibitive. U.S. Pat. Nos. 4,350,087, 4,506,601, 5,222,430, 5,232,552, 5,257,575, and 5,289,763 disclose such juicers.

U.S. Pat. No. 4,240,338 discloses a juicer attachment for a food processor. The patent discloses an attachment for the extraction of citrus fruit juice, including a trough member and a domed citrus juice extracting member. The juicer attachment is not readily adaptable for use with a blender and does not disclose a device for juicing vegetables.

SUMMARY OF THE INVENTION

It is accordingly an object of the invention to provide a juicer attachment for a blender, which overcomes the above-mentioned disadvantages of the heretofore-known devices and methods of this general type and which provides an inexpensive blender attachment for making fresh juice, including vegetable and fruit juice.

With the foregoing and other objects in view there is provided, in accordance with the invention, in combination with a blender having a motor, a blade member having a bore formed therein and being driven by the motor, and a jar protruding into the bore of the blade member, a juicer attachment comprising: a hollow base having a lip and a side wall, the base being secured in the bore of the blade member with the lip of the base being in contact with the jar; a hollow filter being disposed in the jar and having perforations formed therein, the filter having at least one step forming a lower side wall and an upper side wall, the side wall of the base being coupled with the lower side wall of the filter; a lid having a bore formed therein, the lid having a step forming a lower side wall being coupled with the upper side wall of the filter; and a plunger having a first end and a second end for dislodging clogged food material around the blade member of the blender in the filter by inserting the second end in the bore of the lid.

In accordance with an added feature of the invention, the plunger of the juicer attachment is hollow and the first end is open.

In accordance with an additional feature of the invention, the juicer attachment includes an adapter having at least one step forming an upper side wall and a lower side wall, the lower side wall of the adapter being coupled with the side wall of the base, the upper side wall of the adapter being coupled with the lower side wall of the filter.

With the objects of the invention in view, there is also provided in combination with a blender having a motor, a blade member having a bore formed therein and being driven by the motor, a juicer attachment comprising: a jar protruding into the the bore of the blade member; a hollow base having a side wall and being integrally joined with the jar; a hollow filter being disposed in the jar and having perforations formed therein, the filter having at least one step forming a lower side wall and an upper side wall, the side wall of the base being coupled with the lower side wall of the filter; a lid having a bore formed therein, the lid having a step forming a lower side wall being coupled with the upper side wall of the filter; and a plunger having a first end and a second end for dislodging clogged food material around the blade member of the blender in the filter by inserting the second end in the bore of the lid.

Other features which are considered as characteristic for the invention are set forth in the appended claims. Although the invention is illustrated and described herein as embodied in a juicer attachment for a blender, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
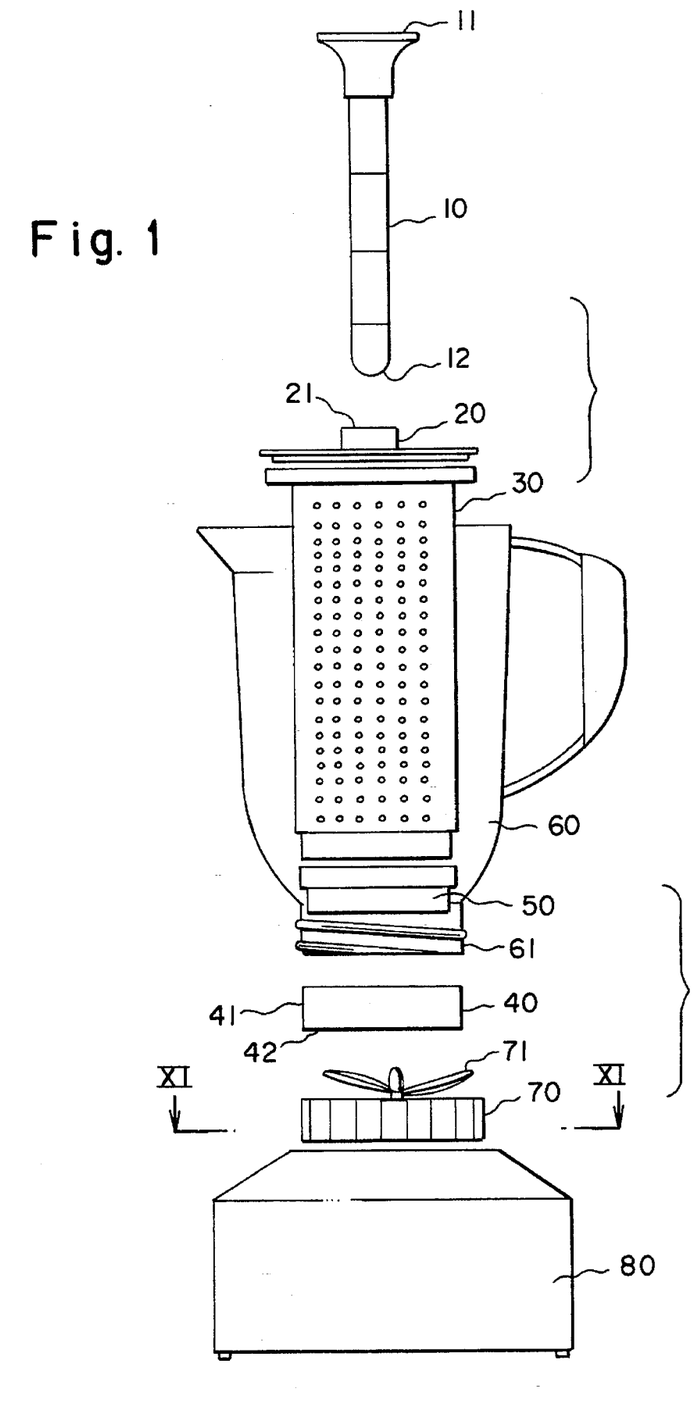
FIG. 1 is a diagrammatic exploded elevational view of a blender with a juicer attachment.

Referring now to the figures of the drawing in detail and first, particularly, to FIG. 1 thereof, there is seen a blender with a juicer attachment. The juicer attachment includes a filter 30 with a lid 20. The lid 20 has a bore 21 into which a plunger 10 is inserted. The plunger 10 of the preferred embodiment is hollow and has an open end 11 and a closed end 12.

The juicer attachment also includes a base 40 for connecting the juicer attachment to a blender. The filter 30 connects directly to the base 40 in one embodiment of the invention. In the embodiment shown in FIG. 1, however, the filter 30 fits inside an adapter 80. The adapter 80 then fits inside the base 40.

Common commercial blenders have a motor 80. A blade member 70 having blades 71 connects to the motor 80. The motor 80 drives the blade member 70 causing the blades 71 to turn. The blade member 70 has an internally threaded bore 72, illustrated in FIG. 11, in which the blades 71 are disposed. Common commercial blenders also include a jar 60 having a threaded end 61, which threads into the internally threaded bore 72 of the blade member 70.

The base 40 of the juicer attachment has a lip 42 and a wall 41. When the juicer attachment is attached to the blender, the base 40 is disposed in the threaded bore 72 of the blade member 70 so that the lip 42 is distal to the blades 71 of the blade member 70. The blender parts are connected together as suggested by the manufacturer so that the threaded end 61 of the jar 60 threads into the threaded bore 72 of the blade member. As a result, the wall 41 of the base 40 is disposed within the threaded end 61 of the jar 60.

FIGS. 2–8 illustrate a first preferred embodiment of the invention of the instant application. As described above, the juicer attachment has a plunger 10, a lid 20, a filter 30, a base 40 and an adapter 50. The plunger 10 has an open end 11 and a closed end 12, which is inserted in a bore 21 of the lid 20. The bore 21 of the lid 20 extends completely through the lid 20. The open end 11 of the plunger 10 has a larger diameter than the diameter of the bore 21 of the lid 20 so that the plunger 10 cannot pass completely through the bore 21 of the lid 20.

Figures 2, 3, 4, 5, 6, 7, 8:
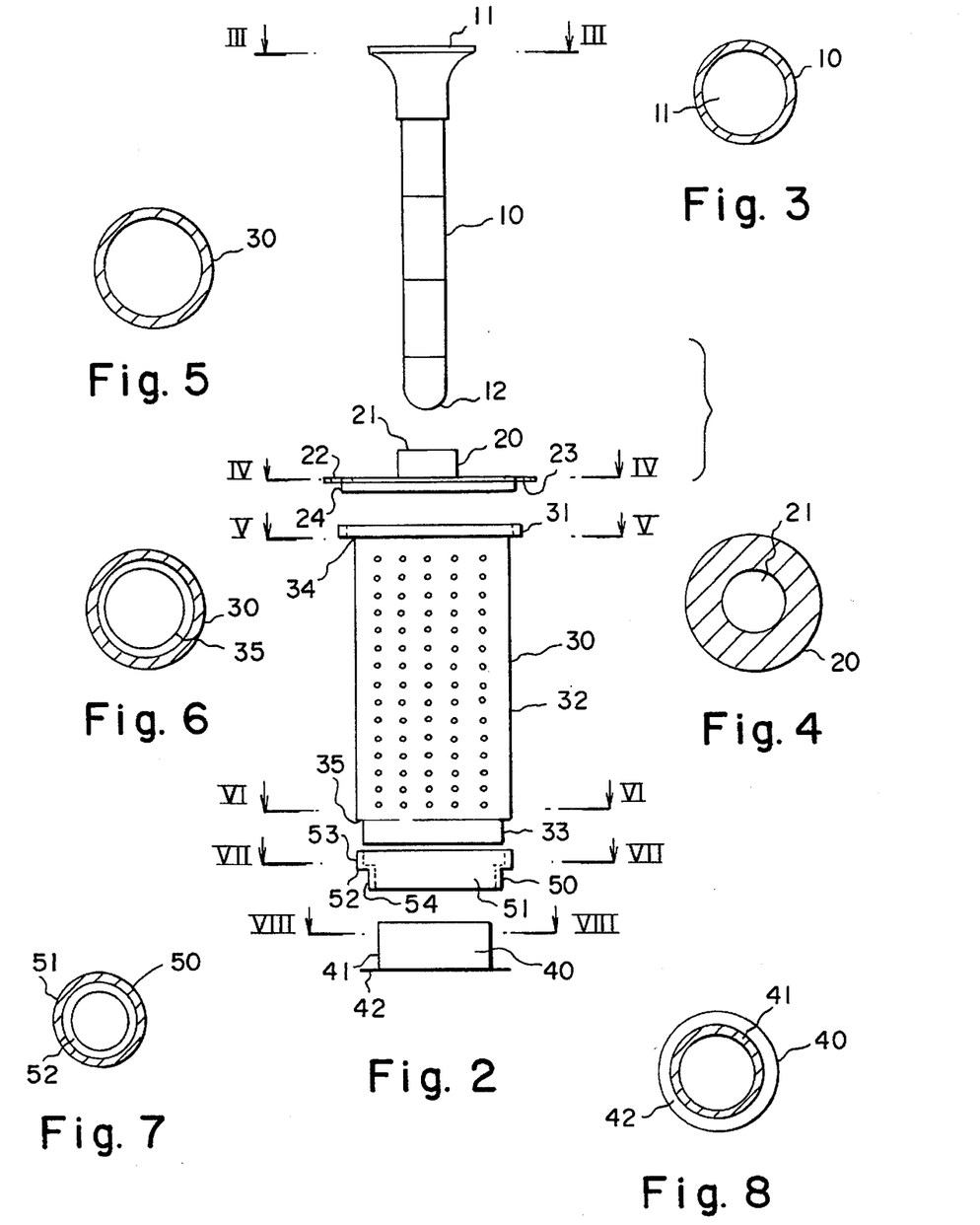
FIG. 2 is an exploded elevational view of a first preferred embodiment of the juicer attachment.
FIG. 3 is a cross-sectional view of a plunger of the juicer attachment which is taken along the line III—III of FIG. 2, in the direction of the arrows.
FIG. 4 is a cross-sectional view of a lid of the juicer attachment which is taken along the line IV—IV of FIG. 2, in the direction of the arrows.
FIG. 5 is a cross-sectional view of a filter of the juicer attachment which is taken along the line V—V of FIG. 2, in the direction of the arrows.
FIG. 6 is a cross-sectional view of the filter of the juicer attachment which is taken along the line VI—VI of FIG. 2, in the direction of the arrows.
FIG. 7 is a cross-sectional view of an adapter of the juicer attachment which is taken along the line VII—VII of FIG. 2, in the direction of the arrows.
FIG. 8 is a cross-sectional view of a base of the juicer attachment which is taken along the line VIII—VIII of FIG. 2, in the direction of the arrows.

The members 20, 30, 40 and 50 of the juicer attachment each have steps so that the members are assembled by slipping the walls of the members around each other. The lid 20 has a lip 22 and a step 23 forming a lower side wall 24. Additionally, the filter 30 has a side wall 32 with a step 34 and a step 35 forming an upper side wall 31 and a lower side wall 33. The lower side wall 24 of the lid 20 fits inside the upper side wall 31 of the filter 30. The adapter 50 has a side wall 51 with a step 52, forming an upper side wall 53 and a lower side wall 54. The lower side wall 33 of the filter 30 fits inside the upper side wall 53 of the adapter 50. The lower side wall 54 of the adapter 50 fits over a wall 41 of the base 40.

As illustrated in FIGS. 4–8, the lid 20, the filter 30, the base 40 and the adapter 50 are each hollow, permitting food to pass through the lid 20 into the filter 30 and to be comminuted by blades 71 of a blender, illustrated in FIG. 1, proximal to the adapter 50 and the base 40.

Additionally, the side wall 32 of the filter 30 is perforated so that juice passes through the perforations as food material is blended and any pulp remains inside the filter 30. If the blades 71 of the blender become clogged by the food material, the plunger 11 may be inserted into the juicer attachment to dislodge the food material around the blades 71 of the blender. Additionally, a liquid may be measured in the plunger 10 and then poured from the open end 11 of the plunger 10 into the bore 21 of the lid 20 to further dilute the clogged food material lodged around the blades 71 of the blender.

Figure 9:
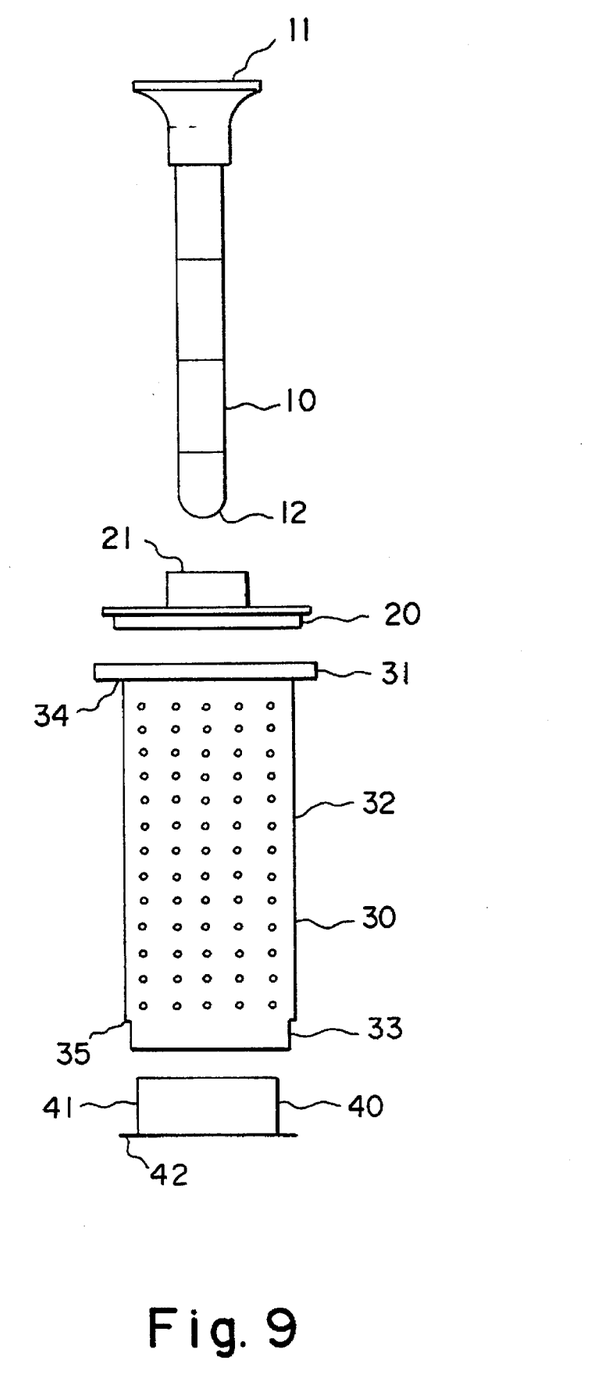
FIG. 9 is an exploded, elevational view of a second preferred embodiment of the juicer attachment.

Another embodiment of the invention of the instant application is shown in FIG. 9. The illustrated embodiment has a plunger 10, a lid 20, a filter 30 and a base 40 like the embodiment illustrated in FIG. 2, but the embodiment of FIG. 9 does not include an adapter 50. Rather, the filter 30 connects directly to the base 40. The filter 30 has an upper side wall 31 and a lower side wall 33 formed by steps 34 and 35 in a side wall 32 similar to the embodiment described above and illustrated in FIG. 2. Also, the base 40 has a wall 41. The lower side wall 33 slips directly over the wall 41 of the base 40.

Figures 10, 11:
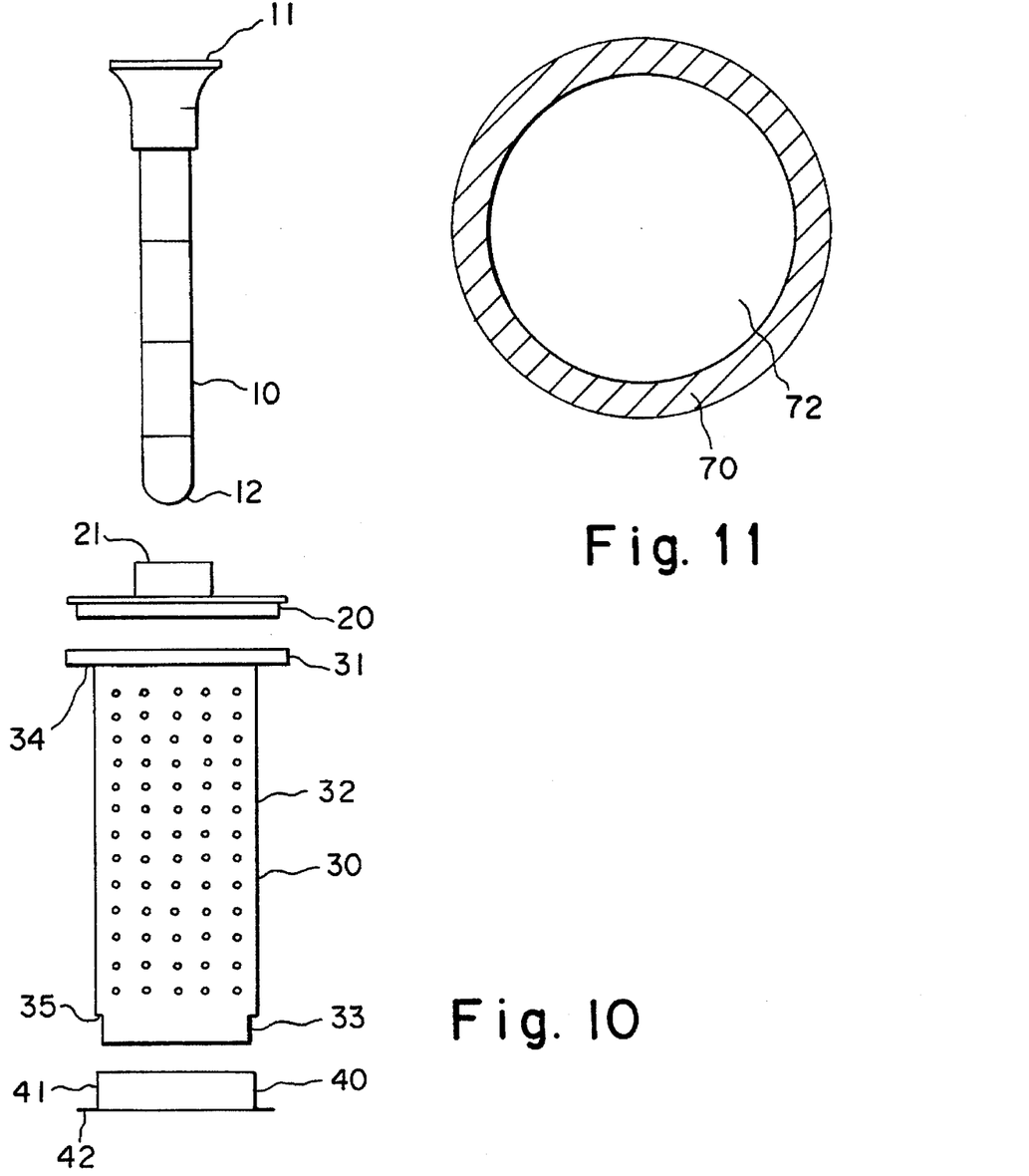
FIG. 10 is an exploded, elevational view of a third preferred embodiment of the juicer attachment.
FIG. 11 is a cross-sectional view of a blade member of the blender which is taken along the line XI—XI of FIG. 1, in the direction of the arrows.

A third embodiment of the invention of the instant application is shown in FIG. 10. The illustrated embodiment has a plunger 10, a lid 20, a filter 30 and a base 40 and is identical to the embodiment illustrated in FIG. 9 except the filter 30 has an alternative connection to the base 40. The filter 30 has an upper side wall 31 and a lower side wall 33 formed by steps 34 and 35 in side wall 32 of the filter 30. Also, the base 40 has a wall 41. The lower side wall 33 of the filter 30 slips inside the wall 41 of the base 40.

Figure 12:
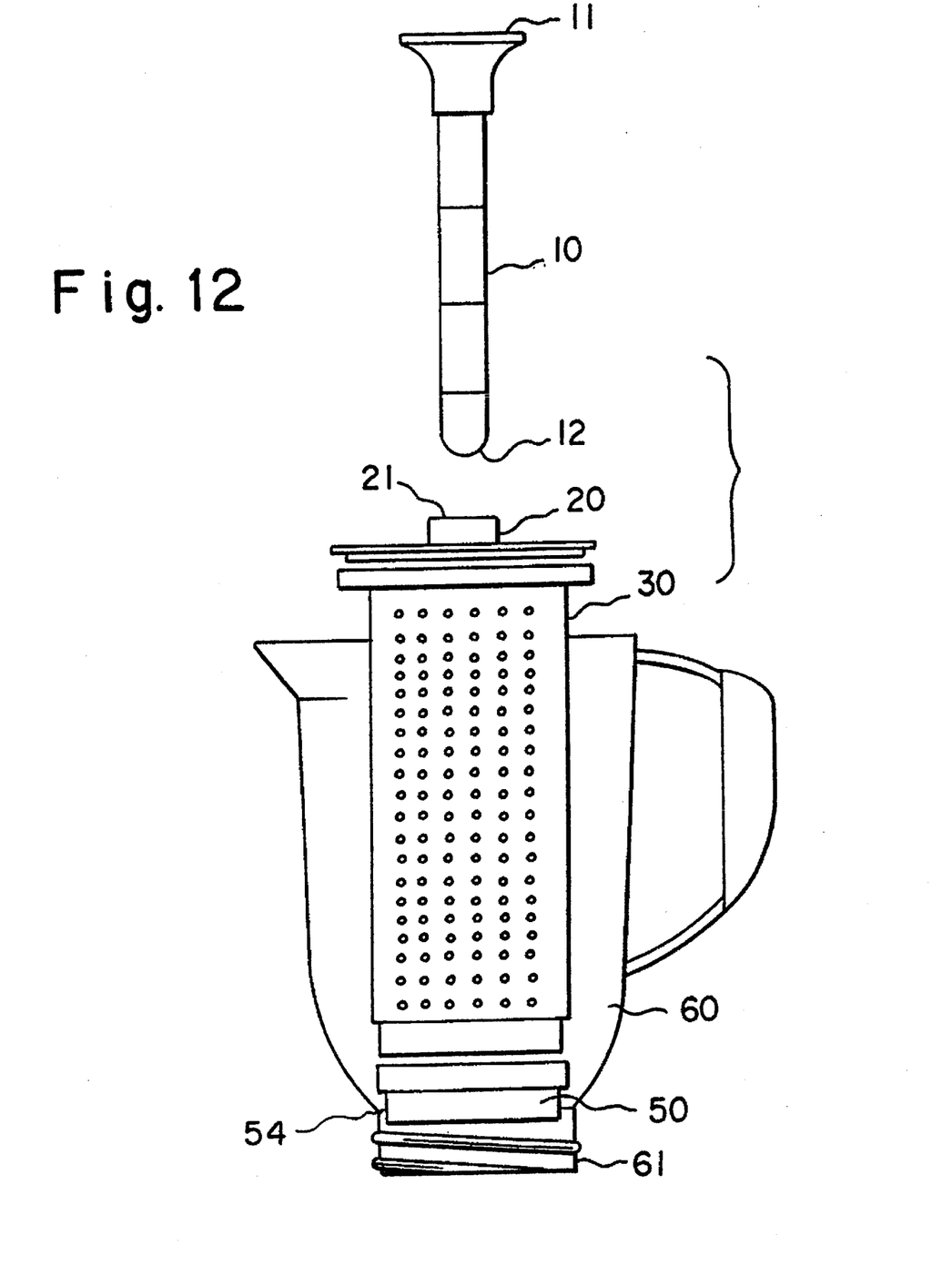
FIG. 12 is an exploded elevational view of a fourth preferred embodiment of the juicer attachment.
Figure 13:
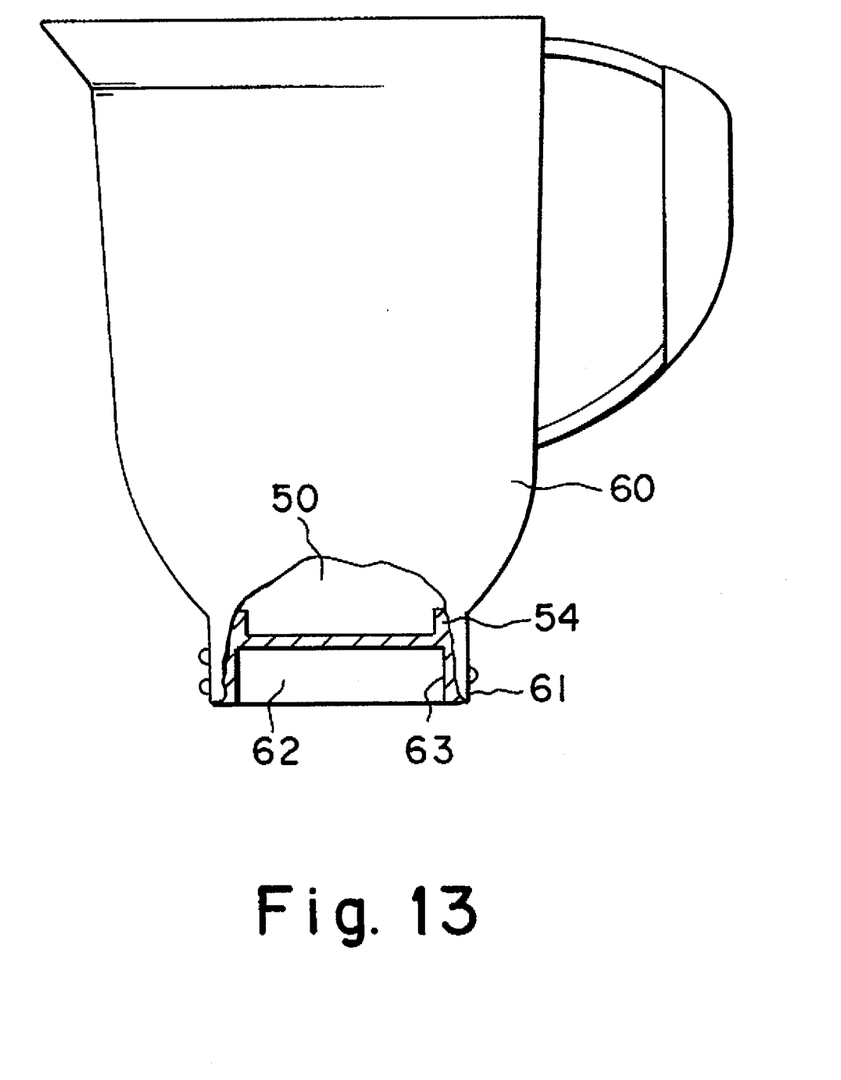
FIG. 13 is a partially broken away elevational view of a jar of the fourth preferred embodiment of the juicer attachment.

A fourth embodiment of the invention of the instant application is illustrated in FIG. 12. The embodiment includes a plunger 10, a lid 20, a filter 30, an adapter 50, and a jar 60. The plunger 10, the lid 20, the filter 30 and the adapter 50 connect to one another as described above for FIG. 2. Additionally, the jar 60 has a base 62 integrally connected to a threaded end 61 of the jar. FIG. 13 is a cut away view of the jar 60 which illustrates the base 62 integrally connected inside of the jar 60. A lower side wall 54 of the adapter 50 slips over a wall 63 of the base 62 of the jar 60.

I claim:

1. In combination with a blender having a motor, a blade member having a bore formed therein and being driven by the motor, and a jar having a bottom region protruding into the bore of the blade member, a juicer attachment comprising:

a hollow base having a lip and a side wall, said base being secured in the bore of the blade member when said lip of said base is in contact with the bottom region of the jar;

a hollow filter being disposed in the jar and having perforations formed therein, said filter having at least one step forming a lower side wall and an upper side wall, said side wall of said base being coupled with said lower side wall of said filter;

a lid having a bore formed therein, said lid having a step forming a lower side wall being telescopically coupled with said upper side wall of said filter; and a plunger having a first end and a second end for dislodging clogged food material around the blade member of the blender in said filter by inserting said second end in said bore of said lid down to the blade member.

2. The juicer attachment according to claim 1, wherein said plunger is hollow and said first end is open.

3. The juicer attachment according to claim 1, including an adapter having at least one step forming an upper side wall and a lower side wall, said lower side wall of said adapter being coupled with said side wall of said base, said upper side wall of said adapter being coupled with said lower side wall of said filter.

4. In combination with a blender having a motor, a blade member having a bore formed therein and being driven by the motor, a juicer attachment comprising:

a jar having a bottom region protruding into the bore of the blade member;

a hollow base having a side wall and being integrally formed at said bottom region of said jar;

a hollow filter being disposed in said jar and having perforations formed therein, said filter having at least one step forming a lower side wall and an upper side wall, said side wall of said base being coupled with said lower side wall of said filter;

a lid having a bore formed therein, said lid having a step forming a lower side wall being coupled with said upper side wall of said filter; and a plunger having a first end and a second end for dislodging clogged food material around the blade member of the blender in said filter by inserting said second end in said bore of said lid down to the blade member.

5. The juicer attachment according to claim 4, wherein said plunger is hollow and said first end is open.

6. The juicer attachment according to claim 4, including an adapter having at least one step forming an upper side wall and a lower side wall, said lower side wall of said adapter being coupled with said side wall of said base, said upper side wall of said adapter being coupled with said lower side wall of said filter.

\* \* \* \* \*

EX PARTE REEXAMINATION CERTIFICATE (5627th)

United States Patent
Baratta (10) Number: US 5,662,032 C1
(45) Certificate Issued: Dec. 5, 2006

(54) JUICER ATTACHMENT FOR A BLENDER

(76) Inventor: Joseph P. Baratta, 9035 Flynn Cir. #3, Boca Raton, FL (US) 33496-6676

Reexamination Request:
No. 90/007,641, Jul. 21, 2005

Reexamination Certificate for:
Patent No.: 5,662,032
Issued: Sep. 2, 1997
Appl. No.: 08/616,210
Filed: Mar. 15, 1996

(51) Int. Cl.
*A23N 1/00* (2006.01)
*B02C 15/00* (2006.01)
*B04B 5/10* (2006.01)

(52) U.S. Cl. .................. 99/513; 366/205; 366/314; 241/37.5; 241/92; 241/282.2; 210/380.1

(58) Field of Classification Search .............. None
See application file for complete search history.

(56) References Cited

U.S. PATENT DOCUMENTS 4,561,782 A * 12/1985 Jacobsen et al. ............ 366/349

D375,024 S 10/1996 Pursley
5,690,021 A 11/1997 Grey

* cited by examiner

*Primary Examiner*—Kiley Stoner (57) ABSTRACT

A juicer attachment for a blender is disclosed. Blenders include a motor, a blade member having a bore and being driven by the motor, and a jar protruding into the bore of the blade member. The juicer attachment has a hollow base with a side wall and a lip for securing the juicer attachment to the blender by disposing the base in the bore of the blade member with the lip of the base being in contact with the jar. The juicer attachment also includes a hollow filter disposed in the jar. The filter has perforations and at least one step forming a lower side wall and an upper side wall. The side wall of the base is coupled with the lower side wall of the filter. The juicer attachment further includes a lid with a bore and a step forming a lower side wall. The lower side wall of the lid is coupled with the upper side wall of the filter. A plunger of the juicer attachment has a first end and a second end for dislodging clogged food material around the blade member of the blender in the filter by inserting the second end in the bore of the lid. A second embodiment of the juicer attachment has a jar with a base integrally joined with the jar.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *

(12) EX PARTE REEXAMINATION CERTIFICATE (6896th)
United States Patent
Baratta (10) Number: US 5,662,032 C2
(45) Certificate Issued: Jun. 23, 2009

(54) JUICER ATTACHMENT FOR A BLENDER (76) Inventor: Joseph P. Baratta, 9035 Flynn Cir #3, Boca Raton, FL (US) 33496-6676

Reexamination Request:
No. 90/008,651, May 19, 2007

Reexamination Certificate for:
Patent No.: 5,662,032
Issued: Sep. 2, 1997
Appl. No.: 08/616,210
Filed: Mar. 15, 1996

Reexamination Certificate C1 5,662,032 issued Dec. 5, 2006

(51) Int. Cl.
*A47J 43/07* (2006.01)
*A47J 43/04* (2006.01)
*A47J 43/046* (2006.01)

(52) U.S. Cl. .................. 99/513; 210/380.1; 241/282.2; 241/37.5; 241/92; 366/205; 366/314

(58) Field of Classification Search .................. None
See application file for complete search history.

(56) References Cited

U.S. PATENT DOCUMENTS

| | | | |
|---|---|---|---|
| 2,794,627 A | 6/1957 | Rodwick | |
| 3,417,972 A | 12/1968 | Vincent | |
| 4,345,517 A | 8/1982 | Arao et al. | |
| 4,397,427 A | 8/1983 | Howard | |
| 4,542,857 A | 9/1985 | Akasaka | |
| 5,222,430 A | 6/1993 | Wang | |
| 5,302,021 A | 4/1994 | Jennett et al. | |
| 5,355,784 A | 10/1994 | Franklin et al. | |
| 5,421,248 A | 6/1995 | Hsu | |
| 5,479,851 A | 1/1996 | McClean et al. | |
| D375,024 S | 10/1996 | Pursley | |

*Primary Examiner*—Stephen J Stein (57) ABSTRACT

A juicer attachment for a blender is disclosed. Blenders include a motor, a blade member having a bore and being driven by the motor, and a jar protruding into the bore of the blade member. The juicer attachment has a hollow base with a side wall and a lip for securing the juicer attachment to the blender by disposing the base in the bore of the blade member with the lip of the base being in contact with the jar. The juicer attachment also includes a hollow filter disposed in the jar. The filter has perforations and at least one step forming a lower side wall and an upper side wall. The side wall of the base is coupled with the lower side wall of the filter. The juicer attachment further includes a lid with a bore and a step forming a lower side wall. The lower side wall of the lid is coupled with the upper side wall of the filter. A plunger of the juicer attachment has a first end and a second end for dislodging clogged food material around the blade member of the blender in the filter by inserting the second end in the bore of the lid. A second embodiment of the juicer attachment has a jar with a base integrally joined with the jar.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *